United States Patent
Aggarwal et al.

(10) Patent No.: US 12,147,310 B1
(45) Date of Patent: Nov. 19, 2024

(54) GROUP REPLICATION FOR HIGHLY GLOBAL WORKLOADS

(71) Applicant: Amazon Technologies, Inc., Seattle, WA (US)

(72) Inventors: Shitanshu Aggarwal, Seattle, WA (US); Alexander Richard Keyes, Seattle, WA (US); Sharatkumar Nagesh Kuppahally, Issaquah, WA (US); Somasundaram Perianayagam, Seattle, WA (US); Mark Roper, Bainbridge Island, WA (US); Dharmik Dipakbhai Ghoghari, Seattle, WA (US); Akanksha Fouzdar, Sunnyvale, CA (US); Debjyoti Roy, Redmond, WA (US)

(73) Assignee: Amazon Technologies, Inc., Seattle, WA (US)

( * ) Notice: Subject to any disclaimer, the term of this patent is extended or adjusted under 35 U.S.C. 154(b) by 160 days.

(21) Appl. No.: 17/401,021

(22) Filed: Aug. 12, 2021

(51) Int. Cl.
*G06F 11/14* (2006.01)
*G06F 16/182* (2019.01)

(52) U.S. Cl.
CPC ...... *G06F 11/1464* (2013.01); *G06F 11/1425* (2013.01); *G06F 11/1469* (2013.01); *G06F 16/1844* (2019.01)

(58) Field of Classification Search
CPC ............. G06F 11/1464; G06F 11/1425; G06F 11/1469; G06F 16/1844
USPC ......................................................... 711/162
See application file for complete search history.

(56) References Cited

U.S. PATENT DOCUMENTS

| | | | |
|---|---|---|---|
| 10,733,201 B1* | 8/2020 | Chen ................... | G06F 11/1402 |
| 2018/0004745 A1* | 1/2018 | Finkelstein ......... | G06F 16/2255 |
| 2019/0155937 A1* | 5/2019 | Barve .................... | G06F 16/27 |
| 2020/0133793 A1* | 4/2020 | Greenwood ........ | G06F 11/2094 |

(Continued)

OTHER PUBLICATIONS

Weizhong Lu, et al., "Hierarchical Data Replication and Service Monitoring Methods in a Scientific Data Grid", Research Gate, Data Science Journal, vol. 8, May 20, 2009, pp. 1-13.

(Continued)

*Primary Examiner* — Gautam Sain
*Assistant Examiner* — Wei Ma
(74) *Attorney, Agent, or Firm* — S. Scott Foster; Kowert, Hood, Munyon, Rankin & Goetzel, P.C.

(57) ABSTRACT

A geographically distributed data store including a number of geographically distributed regions may be implemented using replication groups that include multiple regions configured according to replication criteria. First tier replication of particular changes to data stored in the distributed data store may be performed in compliance with the replication criteria, where management of replication state is performed with respect to replication across the replication groups. Independent of the first tier replication, individual replication groups may implement second tier replication of changes to data where management of replication state is performed with respect to replication within the particular replication group. Replication group configuration may be determined using the replication criteria which may include thresholds for replication resource utilization, replication latency and utilization of data change logs.

20 Claims, 8 Drawing Sheets

(56) References Cited

U.S. PATENT DOCUMENTS

2021/0089238 A1\* 3/2021 Muniswamy-Reddy ............... G06F 3/0637

OTHER PUBLICATIONS

Najme Mansouri, et al., "Hierarchical data replication strategy to improve performance in cloud computing", Frontiers of Computer Science 15, No. 2, 2021, https://doi.org/10.1007/s11704-019-9099-8, pp. 1-18.

\* cited by examiner

GROUP REPLICATION FOR HIGHLY GLOBAL WORKLOADS

BACKGROUND

Data systems managing large amounts of data on behalf of users may distribute and/or replicate data across geographic regions for a number of reasons, including security issues, disaster prevention and recovery issues, data locality and availability issues, etc. As the scale of data stored and geographic regions increases, data systems may implement different techniques for distributing and replicating data to cope with the increasing demand upon data storage resources and to provide performant replication to dynamically changing access demands. However, as the number of geographic regions increases, replication latency and replication demand on storage resources also increase leading to performance, consistency and data integrity issues that may increasingly fall short of user needs.

Figure 1:
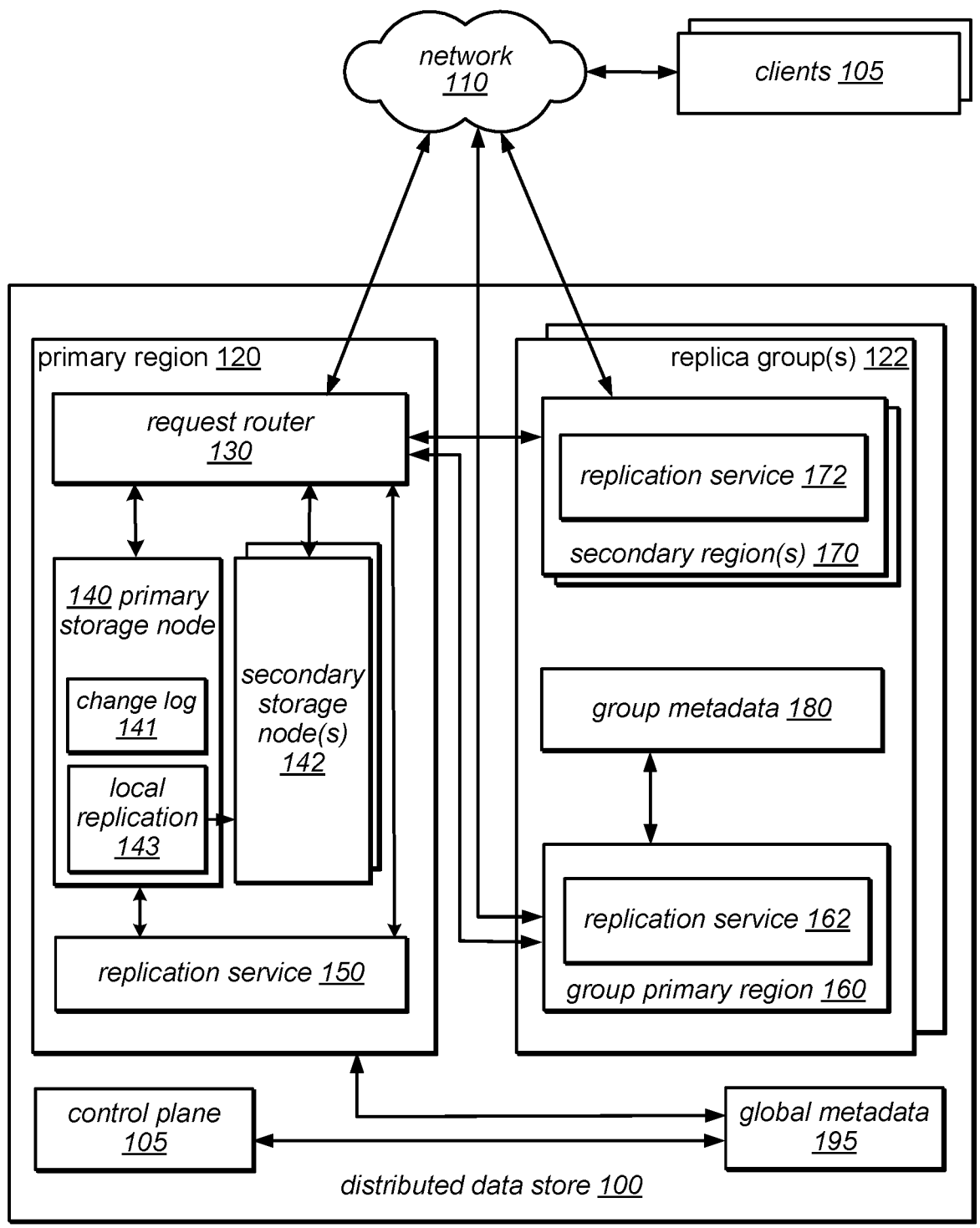
FIG. 1 is a block diagram of a system that implements a geographically distributed data store using tiered replication, according to some embodiments.

While embodiments are described herein by way of example for several embodiments and illustrative drawings, those skilled in the art will recognize that the embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). The words "include," "including," and "includes" indicate open-ended relationships and therefore mean including, but not limited to. Similarly, the words "have," "having," and "has" also indicate open-ended relationships, and thus mean having, but not limited to. The terms "first," "second," "third," and so forth as used herein are used as labels for nouns that they precede, and do not imply any type of ordering (e.g., spatial, temporal, logical, etc.) unless such an ordering is otherwise explicitly indicated.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While B may be a factor that affects the determination of A, such a phrase does not foreclose the determination of A from also being based on C. In other instances, A may be determined based solely on B.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

DETAILED DESCRIPTION

Various embodiments of a geographically distributed data store including replication groups for tiered replication are disclosed. The geographically distributed data store may implement global tables (e.g., collections of various data objects, items, records, documents, and so on, that include one or more attributes, values, fields, or columns) with regional replicas arranged into replica groups, where a total number of geographic regions, each containing one or more replicas of the data store, exceeds the number of replica groups. Individual replica groups may maintain local replication state for the group and replication within the group may be performed asynchronously with respect to replication of data from a primary region of the data store and individual ones of the replica groups. In this way, the number of replica groups, and the composition of those groups, may be configured independent of the number of replica regions and total replication nodes to allow for various optimizations of robustness, region isolation, performance and protection against data loss. In some embodiments, further replication of data within individual geographic regions may be employed.

To implement data replication, geographically distributed data stores often implement change logs describing sequences of changes made to data stored within a data store. To replicate data, the data store may send individual entries of a change log to individual replica destinations in specific sequence. As the number of replica destinations increases, accesses to the change log may dramatically increase, eventually impacting or limiting performance of the distributed data store. Furthermore, as the number of replica destinations increases, latency to replica a specific change may also increase resulting in a system that requires increasing amounts of time to provide consistency of data. By configuring replication to be across a determined number of replica groups less than the total number of replica destinations, performance issues may be mitigated in some embodiments.

As shown in FIG. 1, in various embodiments a geographically distributed data store 100 may be implemented as part of a provider network using a plurality of computing nodes distributed among a primary region 120 and one or more replica groups 122, as described herein. The provider network can be formed as a number of regions, where a region is a separate geographical area in which the cloud provider clusters data centers. Each region can include two or more availability zones connected to one another via a private high speed network, for example a fiber communication connection. An availability zone (also known as an availability domain, or simply a "zone") refers to an isolated failure domain including one or more data center facilities with separate power, separate networking, and separate cooling from those in another availability zone. Preferably, availability zones within a region are positioned far enough away from one other that the same natural disaster should not take more than one availability zone offline at the same time. Customers can connect to availability zones of the provider network via a publicly accessible network (e.g., the Internet, a cellular communication network). Regions are connected to a global network which includes private networking infrastructure (e.g., fiber connections controlled by the cloud provider) connecting each region to at least one other region. The provider network may deliver content from points of presence outside of, but networked with, these regions by way of edge locations and regional edge cache servers. An edge location can be an extension of the cloud provider network outside of the traditional region/AZ context. For example an edge location can be a data center positioned to provide capacity to a set of customers within a certain latency requirement, a set of servers provided to a customer's premises, or a set of servers provided within (or forming part of) a cellular communications network, each of which can be controlled at least in part by the control plane of a nearby AZ or region. This compartmentalization and geographic distribution of computing hardware enables the provider network to provide low-latency resource access to customers on a global scale with a high degree of fault tolerance and stability.

The traffic and operations of the cloud provider network may broadly be subdivided into two categories in various embodiments: control plane operations carried over a logical control plane and data plane operations carried over a logical data plane. While the data plane represents the movement of user data through the distributed computing system, the control plane represents the movement of control signals through the distributed computing system. The control plane generally includes one or more control plane components distributed across and implemented by one or more control servers. Control plane traffic generally includes administrative operations, such as system configuration and management (e.g., resource placement, hardware capacity management, diagnostic monitoring, and system state information). The data plane includes customer resources that are implemented on the cloud provider network (e.g., computing instances, containers, block storage volumes, databases, and file storage). Data plane traffic generally includes non-administrative operations such as transferring customer data to and from the customer resources. Certain control plane components (e.g., tier one control plane components such as the control plane for a virtualized computing service) are typically implemented on a separate set of servers from the data plane servers, while other control plane components (e.g., tier two control plane components such as analytics services) may share the virtualized servers with the data plane, and control plane traffic and data plane traffic may be sent over separate/distinct networks.

In some embodiments, the distributed data store 122 may provide or be a component of a relational database service or non-relational database (e.g., NoSQL, key-value, graph, document, time series or various other types of databases that do not utilize a relational database model of tables, rows, and columns to model data) service of the provider network. It should be understood, however, that such database services are merely examples of distributed data stores, that other embodiments may be envisioned and that these example embodiments are not intended to be limiting.

In some embodiments, the distributed data store 100 of FIG. 1 may be composed of multiple regions, such as the primary region 120 and the replica group primary region 160 and secondary region(s) 170 of respective replica group(s) 122, each region of which may perform one or more of the functions described herein. Various collections of computing nodes within a primary region 120 may implement a request router 130 replication service 150, primary storage node 140 and secondary storage node(s) 142, in some embodiments. In addition, the data store services platform 100 may include global metadata 195, in some embodiments, and may include a control plane 105 that may configure and manage the distributed data store 100 using the global metadata 195.

The global metadata 195 may, in some embodiments, include replication criteria usable by the control plane to configure and manage the replica group(s) 122 of the distributed data store 100. Various computing elements such as storage nodes, request routers and control plane of the distributed data store may be implemented using various computing devices, such as the computer system 2000 disclosed below in FIG. 8, in some embodiments.

The distributed data store 100 may, in some embodiments, implement global tables which include replicas maintained at the primary region 120 as well as respective regions of the replica groups 122. In some embodiments, some regions may not maintain regional replicas but may only provide request routing for a global table.

Clients 105 may connect via network 110 to the distributed data store 100 at any of the regions of the global table, in some embodiments. In one embodiment, clients 105 may explicitly use an appropriate connection for their local region and potentially a second connection for the primary region if desiring strongly consistent operations. If a region becomes inaccessible, the applications may explicitly switch to a connection to a different region, in some embodiments.

In another embodiment, the distributed data store may transparently route requests to the most appropriate region based on proximity and the desired consistency. Moreover, clients 105 may automatically fail over if the currently connected region becomes unreachable such as due to regional outage, in some embodiments.

A request router component 130 within the primary region 120, as well as within various regions of replica group(s) 122 (not shown, see FIG. 2), may route requests among regions in order to satisfy consistency types associated with the requests, in some embodiments. Requests associated with or otherwise using a strong consistency type, for example, including both read and write requests, may be routed to the primary region 120 while requests able to accept eventual consistency may be routed to a secondary region request router, in some embodiments. Should a request able to accept eventual consistency be received at a request router associated with the primary region, in some embodiments the request may be forwarded by request router to a region of a replica group 122. Please note that the previously discussed consistency types are examples of various consistency types, but other consistency types may be implemented in some embodiments.

In some embodiments, the request router may use various information contained with the requests to determine proper routing. Examples of such information may include identification of the client 105 submitting the request, type of consistency for the request, particular performance criteria for the request, or the type of data being accessed by the request. It should be understood, however, that these examples are not intended to be limiting.

Consistency types may be associated in a number of ways. In one embodiment, a consistency type may be specified using a field contained with the request itself, while in another embodiment a consistency type may be associated with the application submitting the request or with the client of data store service. It should be understood, however, that other embodiments associating consistency types with requests can be envisioned and that these example embodiments are not intended to be limiting.

The individual regions may implement a variety of data store architectures, in various embodiments. In some embodiments, the regions may implement a plurality of storage nodes including primary storage node 140 and secondary storage node(s) 142, each containing replicas of the global table which are maintained asynchronously with respect to other replicas of the primary region 120. Associated with the respective replicas maintained at the various storage nodes may be a change log, such as the change log 141 shown for the primary storage node 140 of the primary region 120. The primary storage node 140 may maintain an authoritative replica for the primary region 120 and perform all writes for the primary region 120 as well as reads requiring strong consistency guarantees. Writes to the authoritative replica for the primary region 120 may be recorded in the change log 141. Replication between the storage nodes 140 and 142 may be performed by a local replication 143 of the replication service 150 and requests may be routed to the storage nodes based, in part, on request type and associated consistency types, in some embodiments. Any number of means of local replication may be employed within individual regions, including different means of local replication for different regions.

While the example embodiment uses asynchronous replication and a single primary storage node, it should be understood that other architectural embodiments for the individual regions can be envisioned and that these example embodiments are not intended to be limiting. Furthermore, it should also be understood that different regions can implement different architectural embodiments.

In some embodiments, the primary region 120 may store and maintain an authoritative copy of data in the distributed data store 100. To replicate this data to other regions of the distributed data store 100, a replication service 150 of the primary region 120 may send changes made to data in the distributed data store 100 to group primary regions 160 via the request router 130, in some embodiments. By restricting replication from the primary region 120 to only group primary regions 160, rather than to all regions of the distributed data store 100, the distributed data store 100 may benefit in reduced load on primary region resources and/or improved replication latency, in some embodiments. Group primary regions 160 may then replicate changes to data received from the primary region 120 to respective secondary regions 170 via replication services 162 and 172, in some embodiments. Group replication may be performed asynchronously with respect to global replication, with group replication state maintained in group metadata 180, according to some embodiments.

For a global table, configuration information may be stored in the global metadata 195 as shown in FIG. 1. Various types of information may be maintained for a global table, for example the set of regions in which the global table is replicated, the replica group configuration, global replication state and the designated primary region for the table, in some embodiments. In one embodiment, the global metadata 195 is, itself, a global table that is replicated in all regions. This way, global metadata remains highly available and is accessible for reading with low latency. In this embodiment, the global metadata table may be primaried in one region. Updates to global metadata may be performed infrequently as strongly consistent writes so that all updates may be first applied in the primary region, in some embodiments.

Replication performed in the replication service 150 can tolerate out-of-date metadata about the set of replicas for a global table, in some embodiments. These replications may, therefore, read metadata using eventually consistent reads and cache the metadata, refreshing the cached metadata only when it is discovered that metadata is missing or has possibly changed. These replications, however, require up-to-date information about a global table's primary region, in some embodiments. Because it is impractical for a request router to read from the global metadata table for each strongly consistent request they receive, primary leases may be used in some embodiments.

Because authoritative global metadata 195, when implemented in a global table, resides in a single primary region, this metadata may be vulnerable to regional outage, in some embodiments. To guarantee that metadata updates, including creating global tables and renewing primary leases, can always be performed, eventually consistent writes may be used when the global metadata primary region is unavailable, in some embodiments. Such writes can update the metadata in any region with the results propagated to all other regions through replication, in some embodiments. Applications accessing the metadata with eventually consistent reads will be unaffected, in some embodiments.

Eventually consistent metadata updates can lead to a possibility where some components can access the metadata primary region while others cannot, in some embodiments. In this case, each component may settle on different primaries for the same table. The consequence is that applications may issue strongly consistent writes to two different regions, and strongly consistent reads may not see strongly consistent writes in another region, in some embodiments. This does not violate convergence as replicas will eventually reach a mutually consistent state once the network partition heals, in some embodiments. It may, however, temporarily violate strong consistency guarantees.

A lease mechanism can ensure that no more than one primary exists for each global table at any point in time and allows primary information to be cached effectively, in some embodiments. Each primary lease may have an expiration time, in some embodiments. When the primary lease expires, it can be renewed by the same region or acquired by a new region that takes over as the primary, in some embodiments. The primary of a global table may be guaranteed to not change before the current primary lease expires, even if the primary region fails and a forced switchover is requested, in some embodiments.

Request routers and replication services can cache primary information until the expiration time (or shortly before that accounting for clock asynchrony), in some embodiments. A request router may either flush its cache when a primary lease expires or proactively refresh its cache before the lease expires, in some embodiments. Longer leases may be refreshed less frequently, thereby increasing scalability, but also delay primary region changes, in some embodiments. Reading the primary lease metadata with eventual consistency may be performed because expiration times are explicit, and may be beneficial as long as the lease duration is longer than the cross-region replication lag, in some embodiments.

Nodes that cache and use primary information cannot be assumed to have tightly synchronized clocks, in some embodiments. Thus, they may not agree on whether a primary lease has expired, potentially leading to incorrect behavior, in some embodiments. An upper bound on clock divergence may be assumed and leases treated conservatively. This bound can be fairly high if lease durations are long, in some embodiments. For example, using a clock bound of one second, lease durations of five minutes may be reasonable, in some embodiments. Clients caching primary information may act as though the lease expires one second early according to their local clocks, in some embodiments. Regions wishing to acquire primary may act as though the current lease expires one second late according to their clocks, in some embodiments.

Figure 2:
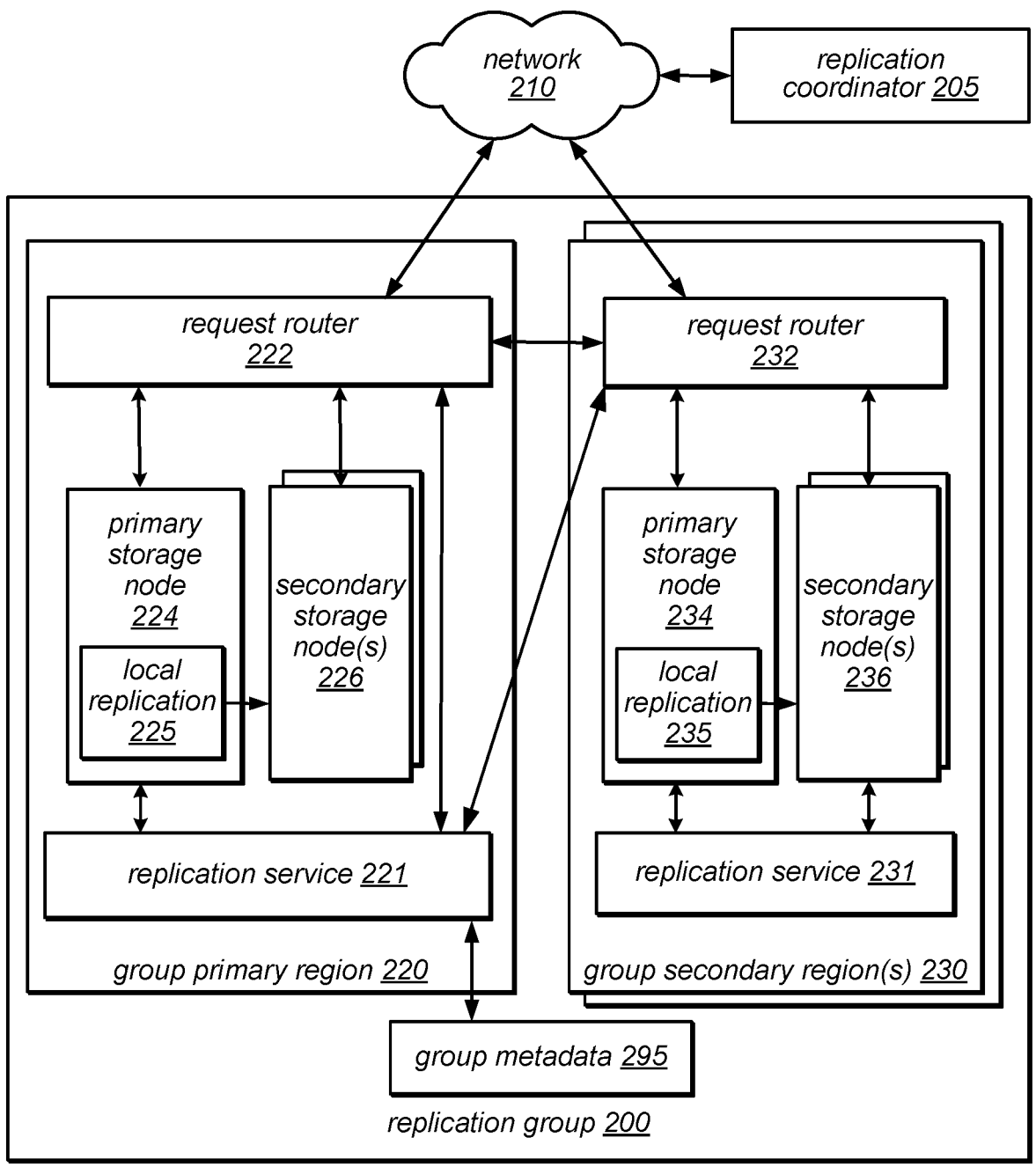
FIG. 2 is a block diagram illustrating a replication group of a geographically distributed data store using tiered replication, according to some embodiments.

FIG. 2 is a block diagram illustrating a replication group of a geographically distributed data store using tiered replication, according to some embodiments. A replication group 200, such as the replication groups 122 of FIG. 1, may include a group primary region 220, corresponding to group primary region 160 as shown in FIG. 1, and group secondary regions 230, corresponding to secondary regions 160 as shown in FIG. 1

Similar to the primary region 120 of FIG. 1, the group primary region 220 and group secondary region(s) 230 may include request routers 222 and 232 to provide functions similar to the request router 130 of FIG. 1, as discussed above, in some embodiments. Similarly, the group primary region 220 and group secondary region(s) 230 may respectively implement a plurality of storage nodes including primary storage nodes 224 and 234 and secondary storage node(s 226 and 236), each containing replicas of the global table which are maintained asynchronously with respect to other replica regions.

In some embodiments, the group primary region 220 and group secondary region(s) 230 may respectively include a replication services 221 and 231. Included within primary nodes 224 and 234 may be local replication 225 and 235 to provide local replication to secondary node(s) 226 and 236 with the respective regions similar to the local replication 143 as shown in FIG. 1.

To replicate changes to data received from replication coordinator 205 via network 210 to other regions of the replication group 200, replication service 2221 of the group primary region 220 may send changes made to data in the distributed data store 100 to group secondary regions 230 via respective replication services 231, in some embodiments. The replication coordinator 205 may be, in some embodiments, analogous to the replication service 150 of the primary region 120 as shown in FIG. 1. Additionally, in some embodiments the replication service 221 may maintain replication state for the replication group 200 in group metadata 295, in some embodiments.

The replication service 221 may receive changes made to data in the distributed data store 100 from replication coordinator 205, in some embodiments. In some embodiments, the replication service may perform other functions.

Figure 3:
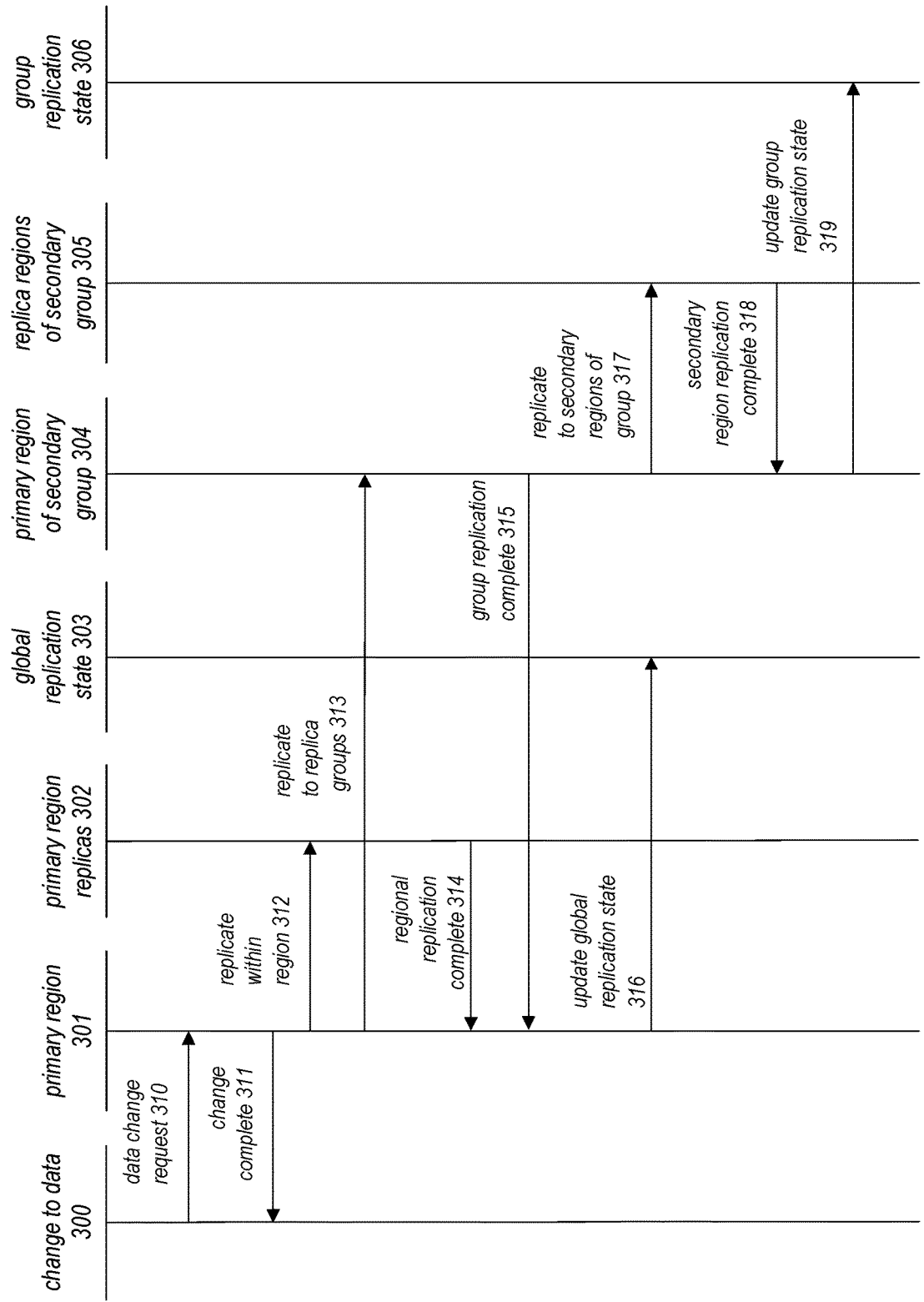
FIG. 3 is a data flow diagram for replicating a data to data of a data store replica groups within the data store, according to some embodiments.

FIG. 3 is a data flow diagram for replicating a data to data of a data store replica groups within the data store, according to some embodiments. In some embodiments, a change to data 300 may be submitted 310 to a primary region 301, such as the primary region 120 of FIG. 1, to change stored in a distributed data store, such as the distributed data store 100 of FIG. 1. This change may be submitted directly from a client of the distributed data store, in some embodiments, or in other embodiments, may be submitted to the primary region 301 from another region of the distributed data store. It should be understood, however, that such origins of the change are merely examples, that other embodiments may be envisioned and that these examples are not intended to be limiting.

Subsequent to receiving the data change 300, the primary region in some embodiments may commit the change to a local copy of the data of the distributed data store, such as may be stored in the primary storage node 140 of FIG. 1, and send a notification that the change is complete 311. In addition, once the change is committed to the local copy of the data of the distributed data store, the primary region 301 may also replicate the change to replicas within the primary region 302, such as the secondary storage node(s) 142 of FIG. 1, such as by using a local replication module 143 of a replication service 150 of the primary region 120 as shown in FIG. 1, in some embodiments. This replication operation may be performed asynchronously to the sending of the change completion 311, in some embodiments. When regional replication is complete, a regional replication completion notification 314 may be sent, for example to the local replication module 143 as shown in FIG. 1.

Once the change is committed to the local copy of the data of the distributed data store, the primary region 301 in some embodiments may also replicate the change to respective primary regions of replica groups 304, such as the group primary region 160 of the replica group(s) 122 of FIG. 1 and the group primary region 220 of the replica group 200 shown in FIG. 2. The primary region of each of the replica groups may commit the change to a replica of the data of the distributed data store in some embodiments, such as may be stored in the primary storage node 250a of FIG. 2, and send a notification that the replication of the change at the replica group is complete 315. Although not shown, a group primary region may, in some embodiments, also replicate the change to replicas within the group primary region, such as the secondary storage node(s) 250b-n of FIG. 1, such as by using a local replication module 270a of a replication service 260a of the group primary region 220 as shown in FIG. 2, in a manner similar to that discussed above with respect to the primary region 301 of the distributed data store. This replication operation may be performed asynchronously to the sending of the change completion 315, in some embodiments.

Upon completion of replicating the change at the secondary group primary region 304, the secondary group primary region 304 may then replicate the change to secondary regions of the group 305, as shown in 317, such as group secondary region(s) 225 as shown in FIG. 2. Upon completion of replication of the change to a particular secondary region is complete, the particular secondary region may send a notification of replication complete 318 to the primary region of the secondary group 304, and once replication to the respective secondary regions has completed, the primary region of the secondary group 304 may then update group replication state 306, as shown in 319, such as replication state stored as part of group metadata 295 as shown in FIG. 2.

Once all or a portion of group replication has completed at respective replica groups, as indicated by receiving completion notifications 318, The primary region 301 of the distributed data store may then update global replication state 316, such as replication state stored as part of global metadata 195 as shown in FIG. 1.

Figure 4:
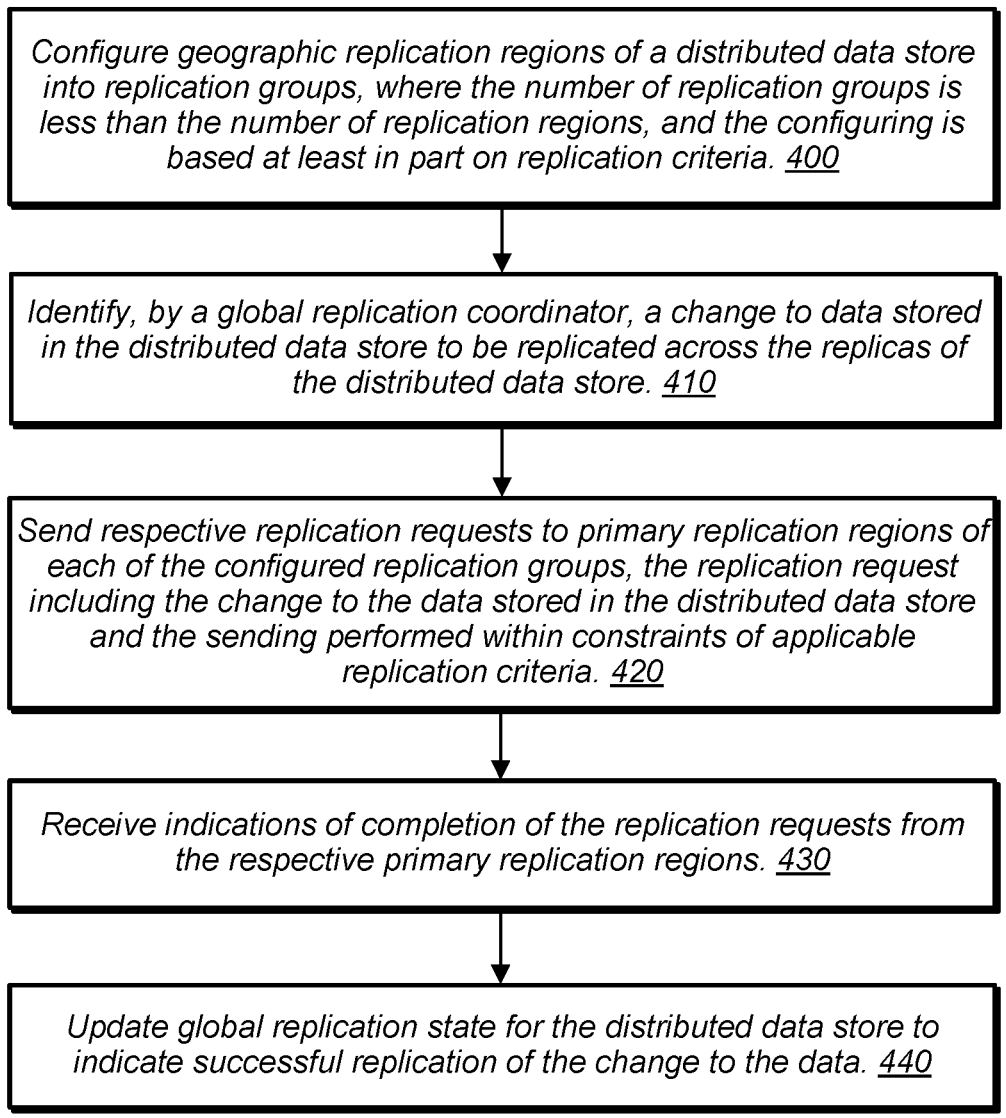
FIG. 4 is a flow diagram illustrating replication of data in a geographically distributed data store configured to use replication groups and tiered replication, according to some embodiments.

FIG. 4 is a flow diagram illustrating replication of data in a geographically distributed data store configured to use replication groups and tiered replication, according to some embodiments. The process begins at step 400 where a control element of a geographically distributed data store, such as the control plane 105 as shown in FIG. 1, may in some embodiments configure the geographically distributed data store into a number of geographic replication groups, such as the replica group(s) 122 as shown in FIG. 1, where the number of geographic replication groups is less than a number of replication regions for the geographically distributed data store such that each of the geographic replication groups has a group replication coordinator region, such as the group primary region 160 as shown in FIG. 1, and at least one of the geographic replication groups has one or more secondary regions, such as the secondary region(s) 170 as shown in FIG. 1.

The configuring of the replication groups may be performed in according with replication criteria, in some embodiments. For example, the replication criteria could include a maximum utilization of a change log of the primary region, such as the change log 141 of FIG. 1, which could be usable to determine a maximum number of replica groups, in one embodiment. In another embodiment, the replication criteria could include a maximum utilization of computing resources within the primary region which could be usable to determine a maximum number of replica groups, In yet another embodiment, the replication criteria could include a maximum latency for replication for all or a portion of the replica regions which could be usable to determine a maximum number of replica groups and/or a maximum number of replica regions within all or a portion of the replica groups. It should be understood, however, that these examples of replication criteria are not intended to be limiting, and any combination of such criteria, including the above criteria or other criteria, may be used.

As shown in 410, a change to data stored in the geographically distributed data store may be identified by a global replication coordinator of the geographically distributed data store, such as global replication module 154 of the primary region 120 as shown in FIG. 1, in some embodiments. This change may correspond with the change to data 300 as shown in FIG. 3.

Next, as shown in 420, the global replication coordinator may send, in some embodiments, respective replication requests to primary replication regions of the respective replication groups, such as in 313 as shown in FIG. 3. These replication requests may include the identified change to be replicated. Furthermore, the sending of the respective replication requests may meet constraints placed on global replication to the replica regions according to any applicable replication criteria.

Next, as shown in 430, the global replication coordinator may receive, in some embodiments, respective indications of replication completion from the respective primary replication regions of the respective replication groups, such as in 315 as shown in FIG. 3. Once all or a determined portion of the indications have been received, in various embodiments, the global replication coordinator may update global replication state, as shown in 440, as part of global metadata, such as global metadata 195 as shown in FIG. 1, for the geographically distributed data store, for example as shown in step 316 of FIG. 3, in some embodiments.

Figure 5:
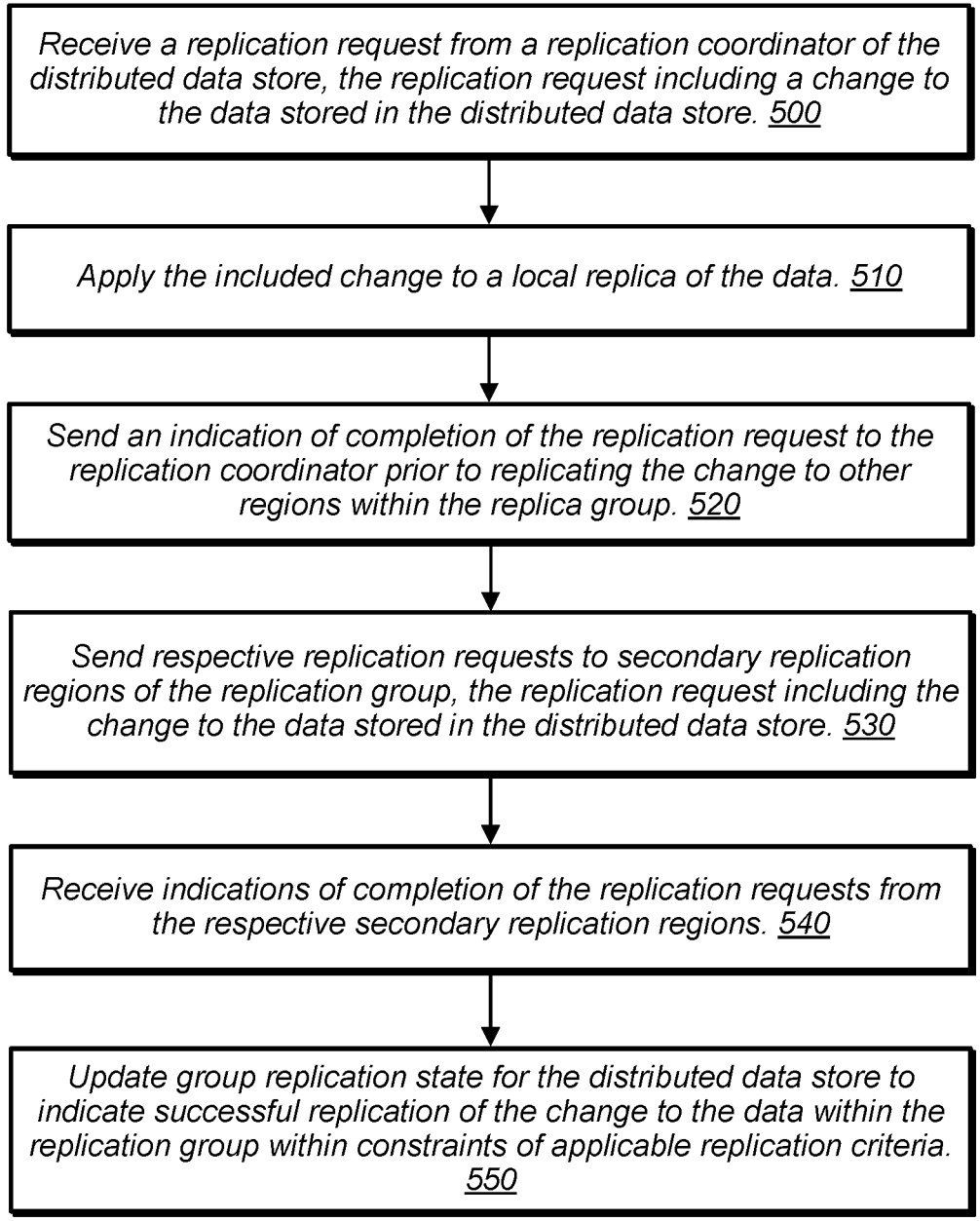
FIG. 5 is a flow diagram illustrating replication of data within a replication group of a geographically distributed data store configured to use replication groups and tiered replication, according to some embodiments.

FIG. 5 is a flow diagram illustrating replication of data within a replication group of a geographically distributed data store configured to use replication groups and tiered replication, according to some embodiments. The process begins at step 500 where a replication request, including a change to data of the geographically distributed data store, may be received by a primary region of a replication group, such as the group primary region 220 as shown in FIG. 2, from a replication coordinator of the geographically distributed data store, such as global replication module 154 of the primary region 120 as shown in FIG. 1, in some embodiments. This change may correspond with the change to data 313 as shown in FIG. 3.

Responsive to receiving the request, the primary region of a replication group may apply the change to a local replica of the data, such as may be stored at primary storage node 250*a* as shown in FIG. 2. In addition, although not explicitly shown in FIG. 5, the primary region of a replication group may further replicate the change within the primary region to one or more secondary storage nodes, such as secondary storage node(s) 250*b-n* as shown in FIG. 2, using local replication, such as provided by local replication module 270*a* as shown in FIG. 2. Any number of means of local replication may be employed within replication regions, including different means of local replication for different replication regions.

Subsequent to completion of applying the change to a local replica of the data, the primary region of a replication group may send an indication of completion of the replication request to the replication coordinator, as shown in 520. This change may correspond with 315 as shown in FIG. 3. In some embodiments, this sending may occur immediately upon completion of applying the change while in other embodiments the sending may occur after all or a portion of local replication may also complete. It should be understood, however, that any number of local replication operations within the replica region may be completed prior to the sending and that the above examples are not intended to be limiting.

Furthermore, the above sending of an indication of completion of the replication request may occur prior to or coincident with replicating the change to other regions within the replication group, in some embodiments, such as in 317 as shown in FIG. 3.

As shown in 530, the primary region of the replication group may then send, in some embodiments, respective replication requests to secondary replication regions, such as the secondary region(s) 225 of FIG. 2, of the replication group, such as in 317 as shown in FIG. 3. These replication requests may include the identified change to be replicated.

Next, as shown in 540, the primary region of the replication group may receive, in some embodiments, respective indications of replication completion from the secondary replication regions of the replication group, such as in 318 as shown in FIG. 3. Once all or a determined portion of the indications have been received, in various embodiments, the primary region of the replication group may update group replication state, as shown in 550, as part of group metadata, such as group metadata 295 as shown in FIG. 2, for the geographically distributed data store, for example as shown in step 319 of FIG. 3, in some embodiments. The sending, completing and updating to implement the replication of the change to the data within the replication group may meet constraints placed on group replication according to any applicable replication criteria.

Figure 6:
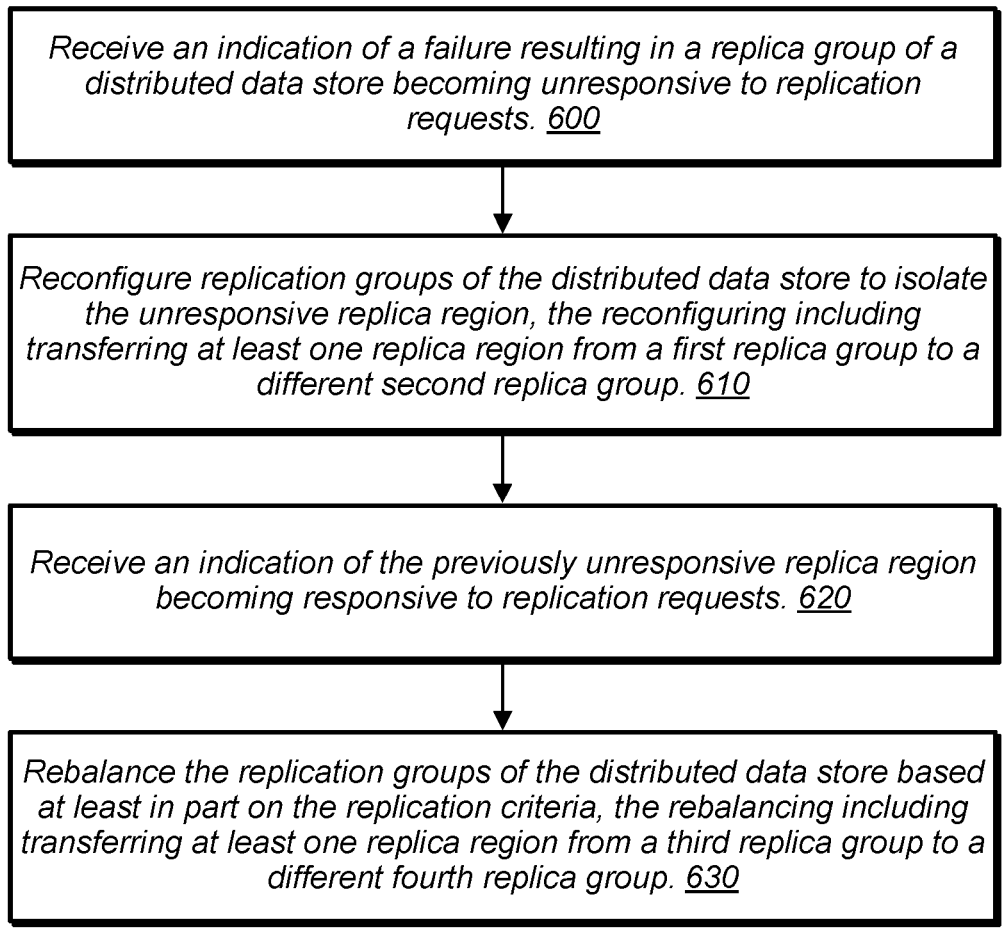
FIG. 6 is a flow diagram illustrating reconfiguration of a geographically distributed data store configured to use replication groups and tiered replication responsive to replication failure, according to some embodiments.

FIG. 6 is a flow diagram illustrating reconfiguration of a geographically distributed data store configured to use replication groups and tiered replication responsive to replication failure, according to some embodiments. The process begins at step 600 where a control element of a geographically distributed data store, such as the control plane 105 as shown in FIG. 1, may receive an indication of a failure resulting in a replica group, such as one of the replica group(s) 122 as shown in FIG. 1, of the geographically distributed data store being unresponsive to replication requests, in some embodiments. As a result of such a failure, group level replication for individual changes to data may be impacted.

Responsive to receiving the indication of failure, as shown in 610, the control plane of the geographically distributed data store may reconfigure, in some embodiments, replication groups of the geographically distributed data store, such as the replica group(s) 122 as shown in FIG. 1, to restore responsiveness of the replication groups to replication requests. This reconfiguring may, in some embodiments, include transferring at least one replication region from a first replica group to a second replica group different from the first replica group to isolate replica regions that are unresponsive to replication requests.

The process may then proceed to step 620 where a control element of a geographically distributed data store, such as the control plane 105 as shown in FIG. 1, may receive an indication that a previously unresponsive replication region of the geographically distributed data store has become responsive to replication requests, in some embodiments.

Responsive to receiving the indication of responsiveness, as shown in 630 the control plane of the geographically distributed data store may rebalance, in some embodiments, replication groups of the geographically distributed data store, such as the replica group(s) 122 as shown in FIG. 1, in accordance with the replication criteria. This rebalancing may, in some embodiments, include transferring at least one replication region from a third replica group to a fourth replica group different from the third replica group to restore previously isolated replica regions that have become responsive to replication requests.

Figure 7:
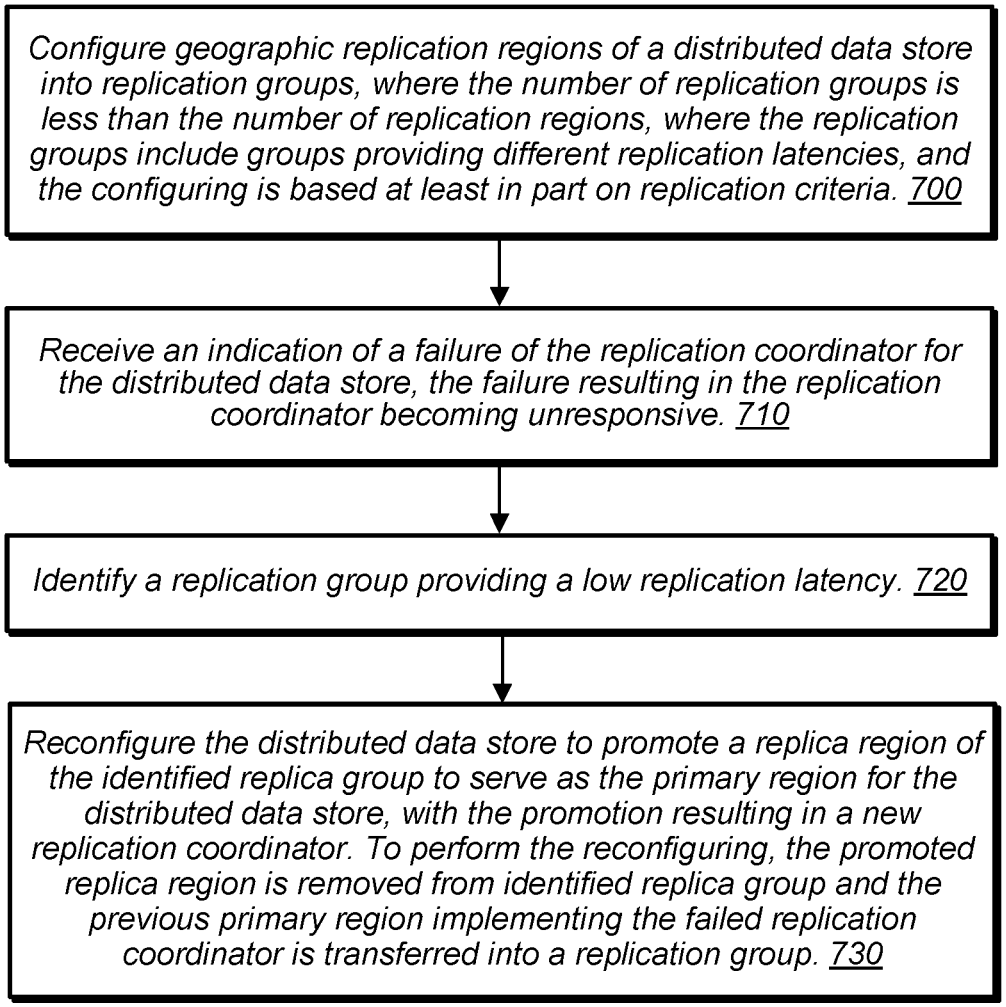
FIG. 7 is a flow diagram illustrating reconfiguration of a geographically distributed data store configured to use replication groups and tiered replication responsive to failure of a replication coordinator, according to some embodiments.

FIG. 7 is a flow diagram illustrating reconfiguration of a geographically distributed data store configured to use replication groups and tiered replication responsive to failure of a replication coordinator, according to some embodiments. The process begins at step 700 where a control element of a geographically distributed data store, such as the control plane 105 as shown in FIG. 1, may in some embodiments configure the geographically distributed data store into a number of geographic replication groups, such as the replica group(s) 122 as shown in FIG. 1, where the number of geographic replication groups is less than a number of replication regions for the geographically distributed data store such that each of the geographic replication groups has a group replication coordinator region, such as the group primary region 160 as shown in FIG. 1, and at least one of the geographic replication groups has one or more secondary regions, such as the secondary region(s) 170 as shown in FIG. 1.

The configuring of the replication groups may be performed in according with replication criteria, in some embodiments. For example, the replication criteria could include a maximum latency for replication for all or a portion of the replica regions which could be usable to determine a maximum number of replica groups and/or a maximum number of replica regions within all or a portion of the replica groups. It should be understood, however, that these examples of replication criteria are not intended to be limiting, and any combination of such criteria, including the above criteria or other criteria, may be used.

In accordance with the replication criteria, the control plane may configure different ones of the replica groups to provide different latencies for replication of individual changes to data store at the geographically distributed data store. As a result, replication of changes to the respective groups may proceed with a latency determined by the total number of configured replication groups, while replication across some replication regions within lower latency replication groups may proceed with lower latency that among other replication regions configured within higher latency replication groups. In this way, the configuration of the respective replication groups may satisfy replication criteria that includes replication latency constraints, in some embodiments.

The process may then proceed to step 710 where a control element of a geographically distributed data store, such as the control plane 105 as shown in FIG. 1, may receive an indication of a failure resulting in the replication coordinator, such as the global replication module 154 of the primary region 120 as shown in FIG. 1, becoming unresponsive, in some embodiments. As a result of such a failure, replication for individual changes to data may be impacted.

Responsive to receiving the indication of failure, as shown in 720, the control plane of the geographically distributed data store may then identify a replication group providing low replication latency, in some embodiments. This identifying provides for the selection of a new primary region with replication latency meeting replication criteria to mitigate data loss caused by the indicated failure.

The control plane, in some embodiments, may then, as shown in 730, reconfigure replication groups of the geographically distributed data store, such as the replica group(s) 122 as shown in FIG. 1, to promote a replica region within the identified replication group to serve as the primary region of the geographically distributed data store. In some embodiments, the promoted replica region may be the primary region of the identified replication group while in other embodiments it may be any replica region of the identified replication group. The promoted replica region may then implement the replication coordinator of the geographically distributed data store, in some embodiments. The control may further transfer the previous primary region implementing the failed replication coordinator to a replication group of the geographically distributed data store.

Figure 8:
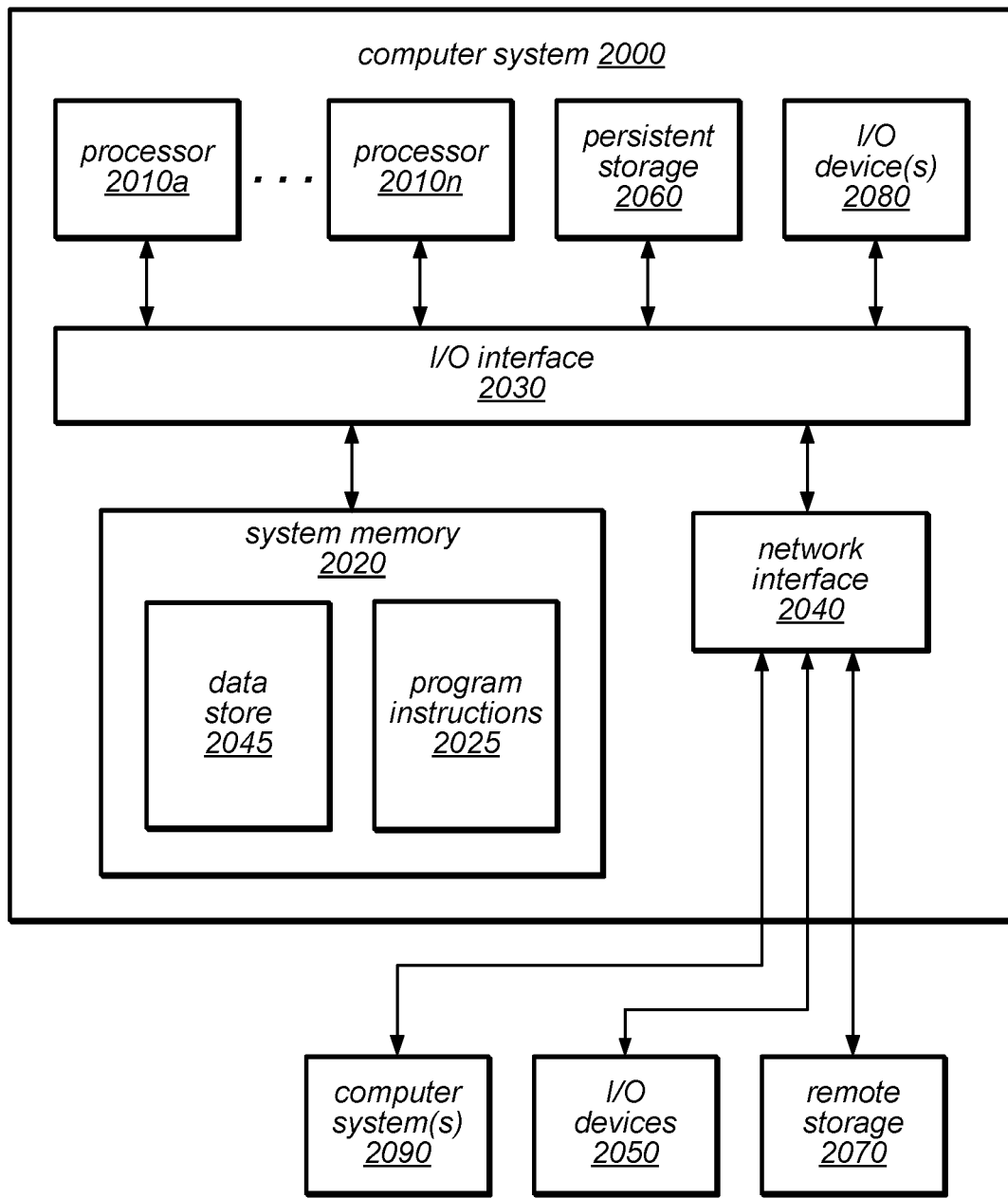
FIG. 8 is a block diagram illustrating an example computer system, according to various embodiments.

Any of various computer systems may be configured to implement processes associated with a technique for multi-region, multi-primary data store replication as discussed with regard to the various figures above. FIG. 8 is a block diagram illustrating one embodiment of a computer system suitable for implementing some or all of the techniques and systems described herein. In some cases, a host computer system may host multiple virtual instances that implement the servers, request routers, storage services, control systems or client(s). However, the techniques described herein may be executed in any suitable computer environment (e.g., a cloud computing environment, as a network-based service, in an enterprise environment, etc.).

Various ones of the illustrated embodiments may include one or more computer systems 2000 such as that illustrated in FIG. 8 or one or more components of the computer system 2000 that function in a same or similar way as described for the computer system 2000.

In the illustrated embodiment, computer system 2000 includes one or more processors 2010 coupled to a system memory 2020 via an input/output (I/O) interface 2030. Computer system 2000 further includes a network interface 2040 coupled to I/O interface 2030. In some embodiments, computer system 2000 may be illustrative of servers implementing enterprise logic or downloadable applications, while in other embodiments servers may include more, fewer, or different elements than computer system 2000.

In various embodiments, computer system 2000 may be a uniprocessor system including one processor 2010, or a multiprocessor system including several processors 2010 (e.g., two, four, eight, or another suitable number). Processors 2010 may be any suitable processors capable of executing instructions. For example, in various embodiments, processors 2010 may be embedded processors implementing any of a variety of instruction set architectures (ISAs), such as the x106, PowerPC, SPARC, or MIPS ISAs, or any other suitable ISA. In multiprocessor systems, each of processors 810 may commonly, but not necessarily, implement the same ISA.

System memory 2020 may store instructions and data accessible by processor 2010. In various embodiments, system memory 2020 may be implemented using any suitable memory technology, such as static random-access memory (SRAM), synchronous dynamic RAM (SDRAM), non-volatile/Flash-type memory, or any other type of memory. In the illustrated embodiment, program instructions and data implementing desired functions, such as those methods and techniques described above for the downloadable software or provider network are shown stored within system memory 2020 as program instructions 2025. In some embodiments, system memory 2020 may include data store 2045 which may be configured as described herein.

In one embodiment, I/O interface 2030 may coordinate I/O traffic between processor 2010, system memory 2020 and any peripheral devices in the system, including through network interface 2040 or other peripheral interfaces. In some embodiments, I/O interface 2030 may perform any necessary protocol, timing or other data transformations to convert data signals from one component (e.g., system memory 2020) into a format suitable for use by another component (e.g., processor 2010). In some embodiments, I/O interface 2030 may include support for devices attached through various types of peripheral buses, such as a variant of the Peripheral Component Interconnect (PCI) bus standard or the Universal Serial Bus (USB) standard, for example. In some embodiments, the function of I/O interface 2030 may be split into two or more separate components, such as a north bridge and a south bridge, for example. Also, in some embodiments, some or all of the functionality of I/O interface 2030, such as an interface to system memory 2020, may be incorporated directly into processor 2010.

Network interface 2040 may allow data to be exchanged between computer system 2000 and other devices attached to a network, such as between a client device and other computer systems, or among hosts, for example. In particular, network interface 2040 may allow communication between computer system 800 and/or various other device 2060 (e.g., I/O devices). Other devices 2060 may include scanning devices, display devices, input devices and/or other communication devices, as described herein. Network interface 2040 may commonly support one or more wireless networking protocols (e.g., Wi-Fi/IEEE 802.7, or another wireless networking standard). However, in various embodiments, network interface 2040 may support communication via any suitable wired or wireless general data networks, such as other types of Ethernet networks, for example. Additionally, network interface 2040 may support communication via telecommunications/telephony networks such as analog voice networks or digital fiber communications networks, via storage area networks such as Fibre Channel SANs, or via any other suitable type of network and/or protocol.

In some embodiments, system memory 2020 may be one embodiment of a computer-accessible medium that stores program instructions and data as described above. However, in other embodiments, program instructions and/or data may be received, sent or stored upon different types of computer-accessible media. Generally speaking, a computer-accessible medium may include computer-readable storage media or memory media such as magnetic or optical media, e.g., disk or DVD/CD-ROM coupled to computer system 2000 via I/O interface 830. A computer-readable storage medium may also include any volatile or non-volatile media such as RAM (e.g. SDRAM, DDR SDRAM, RDRAM, SRAM, etc.), ROM, etc., that may be included in some embodiments of computer system 800 as system memory 2020 or another type of memory. Further, a computer-accessible medium may include transmission media or signals such as electrical, electromagnetic, or digital signals, conveyed via a communication medium such as a network and/or a wireless link, such as may be implemented via network interface 2040.

In some embodiments, I/O devices may be relatively simple or "thin" client devices. For example, I/O devices may be implemented as dumb terminals with display, data entry and communications capabilities, but otherwise little computational functionality. However, in some embodiments, I/O devices may be computer systems implemented similarly to computer system 2000, including one or more processors 2010 and various other devices (though in some embodiments, a computer system 2000 implementing an I/O device 2050 may have somewhat different devices, or different classes of devices).

In various embodiments, I/O devices (e.g., scanners or display devices and other communication devices) may include, but are not limited to, one or more of: handheld devices, devices worn by or attached to a person, and devices integrated into or mounted on any mobile or fixed equipment, according to various embodiments. I/O devices may further include, but are not limited to, one or more of: personal computer systems, desktop computers, rack-mounted computers, laptop or notebook computers, workstations, network computers, "dumb" terminals (i.e., computer terminals with little or no integrated processing ability), Personal Digital Assistants (PDAs), mobile phones, or other handheld devices, proprietary devices, printers, or any other devices suitable to communicate with the computer system 2000. In general, an I/O device (e.g., cursor control device, keyboard, or display(s) may be any device that can communicate with elements of computing system 2000.

The various methods as illustrated in the figures and described herein represent illustrative embodiments of methods. The methods may be implemented manually, in software, in hardware, or in a combination thereof. The order of any method may be changed, and various elements may be added, reordered, combined, omitted, modified, etc. For example, in one embodiment, the methods may be implemented by a computer system that includes a processor executing program instructions stored on a computer-readable storage medium coupled to the processor. The program instructions may be configured to implement the functionality described herein.

Various modifications and changes may be made as would be obvious to a person skilled in the art having the benefit of this disclosure. It is intended to embrace all such modifications and changes and, accordingly, the above description to be regarded in an illustrative rather than a restrictive sense.

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

Embodiments of a persistent object storage with sequential updates as described herein may be executed on one or more computer systems, which may interact with various other devices. FIG. 8 is a block diagram illustrating an example computer system, according to various embodiments. For example, computer system 2000 may be configured to implement nodes of a compute cluster, a distributed key value data store, and/or a client, in different embodiments. Computer system 2000 may be any of various types of devices, including, but not limited to, a personal computer system, desktop computer, laptop or notebook computer, mainframe computer system, handheld computer, workstation, network computer, a consumer device, application server, storage device, telephone, mobile telephone, or in general any type of compute node, computing node, or computing device.

Computer system 2000 includes one or more processors 2010 (any of which may include multiple cores, which may be single or multi-threaded) coupled to a system memory 2020 via an input/output (I/O) interface 2030. Computer system 2000 further includes a network interface 2040 coupled to I/O interface 2030. In various embodiments, computer system 2000 may be a uniprocessor system including one processor 2010, or a multiprocessor system including several processors 2010 (e.g., two, four, eight, or another suitable number). Processors 2010 may be any suitable processors capable of executing instructions. For example, in various embodiments, processors 2010 may be general-purpose or embedded processors implementing any of a variety of instruction set architectures (ISAs), such as the x86, PowerPC, SPARC, or MIPS ISAs, or any other suitable ISA. In multiprocessor systems, each of processors 2010 may commonly, but not necessarily, implement the same ISA. The computer system 2000 also includes one or more network communication devices (e.g., network interface 2040) for communicating with other systems and/or components over a communications network (e.g. Internet, LAN, etc.). For example, a client application executing on system 2000 may use network interface 2040 to communicate with a server application executing on a single server or on a cluster of servers that implement one or more of the components of the embodiments described herein. In another example, an instance of a server application executing on computer system 2000 may use network interface 2040 to communicate with other instances of the server application (or another server application) that may be implemented on other computer systems (e.g., computer systems 2090).

In the illustrated embodiment, computer system 2000 also includes one or more persistent storage devices 2060 and/or one or more I/O devices 2080. In various embodiments, persistent storage devices 2060 may correspond to disk drives, tape drives, solid state memory, other mass storage devices, or any other persistent storage device. Computer system 2000 (or a distributed application or operating system operating thereon) may store instructions and/or data in persistent storage devices 2060, as desired, and may retrieve the stored instruction and/or data as needed. For example, in some embodiments, computer system 2000 may be a storage host, and persistent storage 2060 may include the SSDs attached to that server node.

Computer system 2000 includes one or more system memories 2020 that are configured to store instructions and data accessible by processor(s) 2010. In various embodiments, system memories 2020 may be implemented using any suitable memory technology, (e.g., one or more of cache, static random access memory (SRAM), DRAM, RDRAM, EDO RAM, DDR RAM, synchronous dynamic RAM (SDRAM), Rambus RAM, EEPROM, non-volatile/Flash-type memory, or any other type of memory). System memory 2020 may contain program instructions 2025 that are executable by processor(s) 2010 to implement the methods and techniques described herein. In various embodiments, program instructions 2025 may be encoded in platform native binary, any interpreted language such as Java™ byte-code, or in any other language such as C/C++, Java™, etc., or in any combination thereof. For example, in the illustrated embodiment, program instructions 2025 include program instructions executable to implement the functionality of a multi-tenant provider network, in different embodiments. In some embodiments, program instructions 2025 may implement multiple separate clients, server nodes, and/or other components.

In some embodiments, program instructions 2025 may include instructions executable to implement an operating system (not shown), which may be any of various operating systems, such as UNIX, LINUX, Solaris™, MacOS™, Windows™, etc. Any or all of program instructions 2025 may be provided as a computer program product, or software, that may include a non-transitory computer-readable storage medium having stored thereon instructions, which may be used to program a computer system (or other electronic devices) to perform a process according to various embodiments. A non-transitory computer-readable storage medium may include any mechanism for storing information in a form (e.g., software, processing application) readable by a machine (e.g., a computer). Generally speaking, a non-transitory computer-accessible medium may include computer-readable storage media or memory media such as magnetic or optical media, e.g., disk or DVD/CD-ROM coupled to computer system 2000 via I/O interface 2030. A non-transitory computer-readable storage medium may also include any volatile or non-volatile media such as RAM (e.g. SDRAM, DDR SDRAM, RDRAM, SRAM, etc.), ROM, etc., that may be included in some embodiments of computer system 2000 as system memory 2020 or another type of memory. In other embodiments, program instructions may be communicated using optical, acoustical or other form of propagated signal (e.g., carrier waves, infrared signals, digital signals, etc.) conveyed via a communication medium such as a network and/or a wireless link, such as may be implemented via network interface 2040.

It is noted that any of the distributed system embodiments described herein, or any of their components, may be implemented as one or more network-based services. For example, a compute cluster within a computing service may present computing services and/or other types of services that employ the distributed computing systems described herein to clients as network-based services. In some embodiments, a network-based service may be implemented by a software and/or hardware system designed to support interoperable machine-to-machine interaction over a network. A network-based service may have an interface described in a machine-processable format, such as the Web Services Description Language (WSDL). Other systems may interact with the network-based service in a manner prescribed by the description of the network-based service's interface. For example, the network-based service may define various operations that other systems may invoke, and may define a particular application programming interface (API) to which other systems may be expected to conform when requesting the various operations. though In various embodiments, a network-based service may be requested or invoked through the use of a message that includes parameters and/or data associated with the network-based services request. Such a message may be formatted according to a particular markup language such as Extensible Markup Language (XML), and/or may be encapsulated using a protocol such as Simple Object Access Protocol (SOAP). To perform a network-based services request, a network-based services client may assemble a message including the request and convey the message to an addressable endpoint (e.g., a Uniform Resource Locator (URL)) corresponding to the network-based service, using an Internet-based application layer transfer protocol such as Hypertext Transfer Protocol (HTTP).

In some embodiments, network-based services may be implemented using Representational State Transfer ("RESTful") techniques rather than message-based techniques. For example, a network-based service implemented according to a RESTful technique may be invoked through parameters included within an HTTP method such as PUT, GET, or DELETE, rather than encapsulated within a SOAP message.

Although the embodiments above have been described in considerable detail, numerous variations and modifications may be made as would become apparent to those skilled in the art once the above disclosure is fully appreciated. It is intended that the following claims be interpreted to embrace all such modifications and changes and, accordingly, the above description to be regarded in an illustrative rather than a restrictive sense.

What is claimed is:

1. A system, comprising:
a plurality of replication regions respectively comprising one or more processors and memory;
a control plane for a distributed data store, the control plane comprising one or more processors and memory configured to:
configure, according to replication criteria, the plurality of replication regions into a one or more replication groups of the distributed data store, wherein a number of the one or more replication groups is less than a number of the plurality of replication regions, wherein individual ones of the one or more replication groups respectively comprise a primary data region of the plurality of replication regions, and wherein a replication group of the one or more replication groups further comprises a secondary data region of the plurality of replication regions communicatively coupled via another network to the primary data region of the replication group;
a replication coordinator of the distributed data store comprising one or more processors and memory communicatively coupled via the network to the one or more replication groups, wherein the one or more processors and memory of the replication coordinator are different from the respective one or more processors and memory of individual ones of the plurality of replication regions, wherein the replication coordinator is configured to replicate a change to data stored in the distributed data store to individual ones of the one or more replication groups according to the replication criteria, wherein to replicate the change the replication coordinator is configured to:
send respective replication requests comprising the change to respective primary replication regions of individual ones of the replication groups;
receive respective completion messages for individual ones of the replication requests from the respective primary replication regions of individual ones of the replication groups; and
update, responsive to receiving the respective completion messages, replication state for the distributed data store to indicate replication of the change;
the primary data region of the replication group configured to:
receive the respective replication request comprising the change from the replication coordinator, and responsive to receiving the respective request:
apply the change to a replica of the data local to the primary data region;
send another replication request comprising the change to the secondary data region of the replication group;
receive a completion message for the other replication request from the secondary data region of the replication group;
send a completion message to the replication coordinator to cause the replication coordinator to update the replication state for the distributed data store prior to receiving the completion message for the other replication request from the secondary data region of the replication group; and
update, responsive to at least receiving the completion message for the other replication request from the secondary data region of the replication group, replication state for the replication group to indicate replication of the change, wherein the replication state for the replication group is different from the replication state for the distributed data store.

2. The system of claim 1, wherein the replication criteria comprise a maximum time to complete replication of a change to data.

3. The system of claim 1, wherein the replication criteria comprise a maximum utilization of one or more resources of the replication coordinator to perform replication of a change to data.

4. The system of claim 1, wherein the replication state for the replication group is one of a plurality of respective replication states for respective ones of the replication groups.

5. A method, comprising:
sending, by a replication coordinator of a distributed data store, respective replication requests to respective primary replication regions of one or more replication groups to replicate a change made to data stored in the distributed data store to respective replicas of the data stored at respective ones of the one or more replication groups, the replication groups configured according to replication criteria such that the replicating conforms to the replication criteria, wherein the distributed data store comprises a plurality of replication regions storing respective replicas of the data including the respective primary replication regions and a secondary data region, wherein the replication coordinator and individual ones of the plurality of replication regions respectively comprise one or more computing nodes, and wherein the one or more computing nodes of the replication coordinator are different from respective one or more computing nodes of the individual ones of the plurality of replication regions;

sending, by a primary replication region of a replication group of the one or more replication groups comprising the secondary region responsive to receiving the respective replication request from the replication coordinator, another replication request to the secondary region to replicate a change made to data stored in the distributed data store;

receiving, by the replication coordinator, respective completion messages for individual ones of the replication requests from the respective primary replication regions of individual ones of the replication groups; and updating, by the replication coordinator responsive to receiving the respective completion messages, replication state for the distributed data store to indicate replication of the change, wherein the updating of the replication state for the distributed data store is performed prior to replicating the change to the secondary data region.

6. The method of claim 5, further comprising:

configuring, by a control plane of the distributed data store according to the replication criteria, the plurality of replication regions, respectively comprising one or more processors and memory, into the one or more replication groups of the distributed data store.

7. The method of claim 6, further comprising:

reconfiguring, by the control plane according to the replication criteria, the plurality of replication regions responsive to a failure event, the reconfiguring comprising transferring at least one of the plurality of replication regions from a first replication group to a different second replication group, wherein the one or more replication groups comprise a plurality of replication groups including the first replication group and the second replication group.

8. The method of claim 5, further comprising performing by the primary data region of a replication group of the one or more replication groups comprising the secondary server:

receiving the replication request comprising the change from the replication coordinator;

applying the change to a replica of the data local to the primary data region;

sending a replication request comprising the change to the secondary data region;

receiving a completion message for the replication request from the secondary data region;

sending a completion message to the replication coordinator prior to receiving the completion message for the replication request from the secondary data region; and updating, responsive to at least receiving the completion message for the replication request from the secondary data region, replication state for the replication group to indicate replication of the change, wherein the replication state for the replication group is different from the replication state for the distributed data store.

9. The method of claim 8, wherein the replication state for the replication group is one of a plurality of respective replication states for respective ones of the one or more replication groups.

10. The method of claim 5, wherein the replication criteria comprise a maximum time to complete replication of a change to data.

11. The method of claim 5, wherein the replication criteria comprise a maximum utilization of one or more resources of the replication coordinator to perform replication of a change to data.

12. The method of claim 5, wherein the replication criteria comprise a maximum utilization of a change log of a replica stored by the replication coordinator to perform replication of a change to data.

13. The method of claim 5, wherein a first replication group comprises a lower replication latency than respective replication latencies of other groups of the one or more replication groups, wherein the one or more replication groups comprise a plurality of replication groups including the first replication group, and wherein the method further comprises:

reconfiguring, by a control plane of the distributed data store responsive to a failure of the replication coordinator, the primary data region of the first replication group to perform the role of the replication coordinator.

14. The method of claim 5, wherein the distributed data store is part of a non-relational database service offered by a provider network, wherein individual ones of the one or more replication groups are geographically distributed data store regions, and wherein replicas of data stores of the non-relational data store service are maintained across geographic regions.

15. One or more non-transitory computer-accessible storage media storing program instructions that when executed on or across one or more computing devices cause the one or more computing devices to perform:

sending, by a replication coordinator of a distributed data store, respective replication requests to respective primary replication regions of one or more replication groups to replicate a change made to data stored in the distributed data store to respective replicas of the data stored at respective ones of the one or more replication groups, the replication groups configured according to replication criteria such that the replicating conforms to the replication criteria, wherein the distributed data store comprises a plurality of replication regions storing respective replicas of the data including the respective primary replication regions and a secondary data region, wherein the replication coordinator and individual ones of the plurality of replication regions respectively comprise one or more computing nodes, and wherein the one or more computing nodes of the replication coordinator are different from respective one or more computing nodes of the individual ones of the plurality of replication regions;

sending, by a primary replication region of a replication group of the one or more replication groups comprising the secondary region responsive to receiving the respective replication request from the replication coordinator, another replication request to the secondary region to replicate a change made to data stored in the distributed data store;

receiving, by the replication coordinator, respective completion messages for individual ones of the replication requests from the respective primary replication regions of individual ones of the replication groups; and updating, by the replication coordinator responsive to receiving the respective completion messages, replication state for the distributed data store to indicate replication of the change, wherein the updating of the replication state for the distributed data store is performed prior to replicating the change to the secondary data region.

16. The one or more non-transitory computer-accessible storage media of claim 15, wherein the replication criteria comprise a maximum time to complete replication of a change to data.

17. The one or more non-transitory computer-accessible storage media of claim 15, wherein the replication criteria comprise a maximum utilization of one or more resources of the replication coordinator to perform replication of a change to data.

18. The one or more non-transitory computer-accessible storage media of claim 15, wherein the replication criteria comprise a maximum utilization of a change log of a replica stored by the replication coordinator to perform replication of a change to data.

19. The one or more non-transitory computer-accessible storage media of claim 15, wherein a first replication group comprises a lower replication latency than respective replication latencies of other groups of the one or more replication groups, wherein the one or more replication groups comprise a plurality of replication groups including the first replication group, and wherein in the event of a failure of a primary replication group of the distributed data store the first replication group is configured to become a new primary replication group of the distributed data store.

20. The one or more non-transitory computer-accessible storage media of claim 15, wherein the distributed data store is part of a non-relational database service offered by a provider network, wherein individual ones of the one or more replication groups are geographically distributed data store regions, and wherein replicas of data stores of the non-relational data store service are maintained across geographic regions.

* * * * *